H. CHRISTENSEN.
CREAM RIPENER.
APPLICATION FILED MAR. 2, 1909.
965,687.
Patented July 26, 1910.
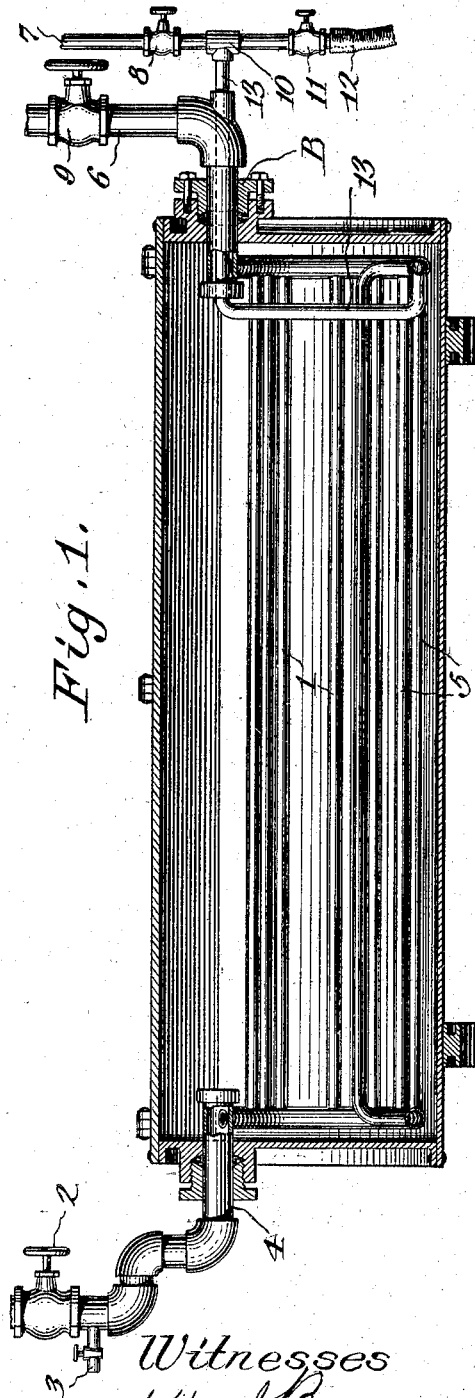
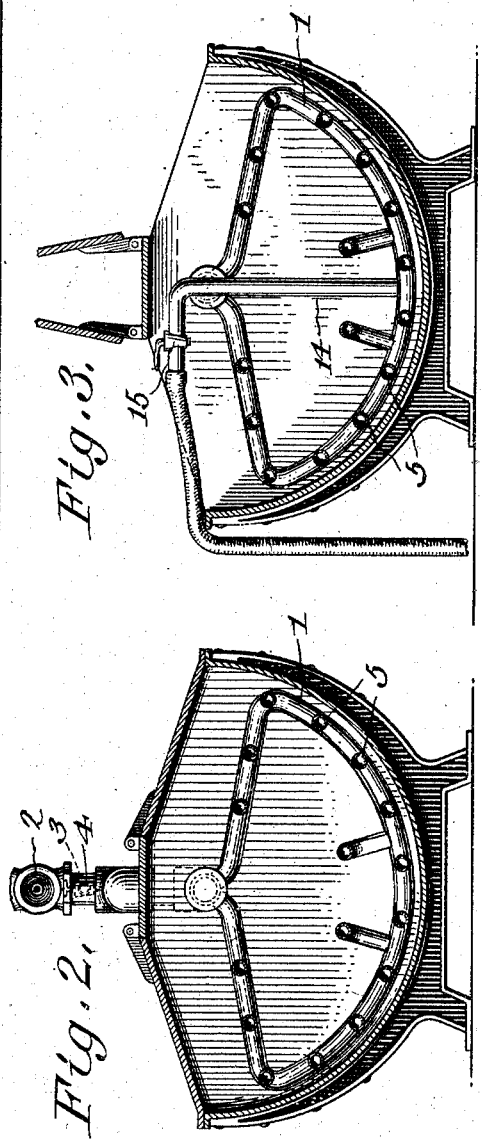
Witnesses
Inventor:
Henry Christensen

UNITED STATES PATENT OFFICE.

HENRY CHRISTENSEN, OF TOMAH, WISCONSIN.

CREAM-RIPENER.

965,687. Specification of Letters Patent. Patented July 26, 1910.

Application filed March 2, 1909. Serial No. 480,997.

*To all whom it may concern:*

Be it known that I, HENRY CHRISTENSEN, a citizen of the United States, residing at Tomah, in the county of Monroe and State of Wisconsin, have invented a new and useful Improvement in Cream-Ripeners, of which the following is a specification.

My invention relates to an improvement in cream ripeners, which comprises a vat for the reception of cream and an oscillating coil, mounted on journals and connected with inlet and outlet pipes, through which (coil and pipes) water or other liquid, hereinafter described as the cooling or heating liquid, flows, while the coil is mechanically made to oscillate in the cream with the effect that the different grades of cream become thoroughly mixed and of the required temperature for the ripening process. Heretofore in such cream ripeners the ripening of the cream has been greatly retarded and delayed owing to the fact that no means has been provided, whereby the cooling or heating liquid can be discharged out of the coil when the desired degree of temperature of the cream is reached. So that liquids of a degree of temperature substantially higher or lower than the temperature required in the cream for the ripening process, could not be used, which made it necessary to moderate the temperature of the cooling or heating liquid before allowing it to enter the coil of the ripener, so that the temperature of the cooling or heating liquid within the coil would be of substantially the same degree as the temperature of the cream in the vat, when the temperature for carrying on the ripening process has been reached, being usually about 80 degrees Fahrenheit.
Furthermore, to wash and clean the coil with facility, it is necessary to swing the coil upon its journals out of the top of the vat and to so swing the coil when it is charged with the cooling or heating liquid is an extremely laborious task.

The object of my invention is to facilitate the ripening process of the cream by rendering the ripener more efficient and to make the swinging or raising of the coil out of the top of the vat less laborious to the attendant or operator, and to this end the invention consists of a pipe, or hose, or other tube, joined on, and connected to the coil in such manner that the said coil through which the water or other liquid circulates while ripening the cream, may be drained or emptied, while the ripener vat contains cream and while the ripener covers are closed, thereby conserving the desired temperature of the cream, without interrupting the free oscillating movement of the coil.

In carrying out my invention the drain pipe, or hose, or other tube, may be modified in its form, size, construction and arrangement as desired, provided the object herein aforesaid is attained.

I attain that object by the mechanism illustrated in the accompanying drawing in which:

Figure 1 is a longitudinal vertical section of the entire machine showing the relative position of the coil, and also the cocks, valves and pipe connections whereby the said coil is drained. Fig. 2 is a vertical cross section of one end of the cream ripener without my improvement. Fig. 3 is a vertical cross section of one end of the cream ripener with my improvement attached.

Similar numerals refer to similar parts throughout the several views.

At 1 and 5 within the vat of the cream ripener, is the coil which I desire to drain or empty.

2 is a cock or valve to regulate or shut off the flow of water or other liquid through the inlet pipe 4, which pipe communicates with, and leads into the inside of the coil.

3 is a cock or valve by means of which a vent or hole is provided in the said inlet pipe for the admission of air into the coil while the said coil is being emptied by means of a pump connected to the pipe 7, which last mentioned pipe communicates, by means of the tee coupling at 10, with the pipe 13—13, known and described herein as the drain pipe; also the above mentioned cock or valve at 3 is provided for the admission of air into the coil, while the said coil is drained or emptied by means of a siphon, by attaching the hose 12, which hose extends below the lowest part or parts of the coil to a pipe or tube, joined to, communicating with, and forming an extension to the drain pipe through the tee coupling at 10.

8 is a cock or valve in the pipe 7 which must be closed when a siphon is used to empty the coil. The outlet pipe 6, is provided with a cock or valve 9 which must be closed to cut off any circulation of air or liquids through the outlet pipe, while the coil is being drained.

11 is a valve or cock which must be closed to cut off the air circulation through the extension pipe when the coil is drained by means of a pump.

13—13 is the drain pipe which constitutes the principal part of my invention. In the accompanying drawing the drain pipe is joined on and attached to the cross-head of the coil; beginning at and opening from the inside and lowest part or parts of the said cross-head, when the coil is at rest and equilibrium and extending, outside of the coil and cross-head, it is conceded that it may be extended inside of the cross-head in a vertical direction, above the cream line, then forming a bend or angle in the said drain pipe and extending it horizontally through the outlet pipe where the latter enters the journal or stuffing box B, to the outside of the cream vat, to communicate with the tee coupling at 10.

14 is a drain pipe to be used as a substitute for the drain pipe 13—13, above described in machines manufactured without my improvement. This pipe at 14 which is provided with a cock or valve 15 to regulate the flow of liquids through it, is attached to the coil in the same manner, performs the same function, and works on the same principles as the drain pipe 13—13 above described, and differs from it, materially, only, in that it is not made to pass through the journals or stuffing boxes as at B.

No special description of joining together, or connecting the coil, pipes, cocks, valves and stuffing boxes or journals described in this specification is thought necessary for any of the ordinary methods in use at or before the date of this improvement may be adopted by any one skilled in the art appertaining to the making of cream ripeners. Therefore the device whereby the drain pipe 13—13 is carried through the journal or stuffing box B is not described in detail as it constitutes no part of my invention, and any methods may be adopted, as aforesaid, provided that the circulation of water or other liquids through the outlet pipe is not barred or cut off by the passing of the drain pipe 13—13 through the journal or stuffing box.

I am aware that the cream coil and the pipe connections herein described and illustrated in the accompanying drawings are in large part old and constitute no part of my invention, namely those parts described and designated by the letter B and the numerals 1, 2, 4, 5, 6, and 9. I am not aware, however, that any one has hitherto applied a pipe or tube, or hose, or its equivalent to the coil in such a manner that the coil could be emptied of water or other liquids, while the covers of the cream ripeners remain closed and the ripener vat contains cream. That therefore which is new and constitutes my improvement is the part described and designated by the numerals 3, 7, 8, 10, 11, 12, 13—13, 14 and 15, which new parts in combination with the old parts enables me to obtain the object, hereinbefore stated, of my invention.

No claim is made in the present case to any particular form or arrangement of the drain pipe, or hose, or other tube, otherwise than as regards the feature of having the said drain pipe or its equivalent begin and extend from the bottom or lowest part or parts of the inside of coil up to and then through the journal or stuffing box B to the outside of the cream vat, in such manner, as not to cut off the possibility of circulation of water or other liquids through the outlet or inlet pipes.

Having described my invention, what I claim is:

1. The combination of an inlet pipe having a cock and a vent provided with a cock, an outlet pipe having a cock, an oscillating coil and a drain tube connected with said coil substantially as set forth.

2. The combination of an inlet pipe having a cock and a vent provided with a cock, an outlet pipe having a cock an oscillating coil and a drain tube connected with the inside of said coil and one of the journals thereof substantially as set forth.

3. The drain pipe 13—13 with tee coupling 10, pipe 7, hose 12 and cocks 8 and 11 attached to it, in combination with the inlet pipe 4, having cocks 3 and 2, the coil 1 and 5 and the outlet pipe 6 having a cock 9 substantially as described and for the purposes set forth.

4. The combination of an inlet pipe having a cock and a vent provided with a cock, an outlet pipe having a cock, an oscillating coil, a drain tube connected with the inside of said coil, the said drain tube having a tee coupling, a hose and pipes each having a cock attached to its outer end, substantially as set forth.

5. In a cream ripener, cock 3 and the drain pipe 13—13 with the tee coupling 10, pipe 7, hose 12 and cocks 8 and 11 attached to it, in combination with the coil 1 and 5 and the inlet pipe 4 having a cock 2 and the outlet pipe 6, having a cock 9, to which they are attached, substantially as described and for the purposes set forth.

6. The combination of an inlet pipe having a cock and a vent provided with a cock, an outlet pipe having a cock, an oscillating coil and a drain tube connected with said coil and one of the journals thereof, the said drain tube having a tee coupling, pipes each provided with a cock and a hose attached to its outer end, substantially as set forth.

HENRY CHRISTENSEN.

Witnesses:
WM. J. BRENNAN,
HEBREBT STROZINSKY.